US008623465B2

United States Patent
Nonokawa et al.

(10) Patent No.: US 8,623,465 B2
(45) Date of Patent: Jan. 7, 2014

(54) COAT FILM FORMING METHOD AND COAT FILM FORMING APPARATUS

(75) Inventors: Masami Nonokawa, Tajimi (JP); Akimasa Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 582 days.

(21) Appl. No.: 12/627,092

(22) Filed: Nov. 30, 2009

(65) Prior Publication Data

US 2010/0075059 A1 Mar. 25, 2010

Related U.S. Application Data

(63) Continuation of application No. PCT/JP2009/051468, filed on Jan. 29, 2009.

(30) Foreign Application Priority Data

Mar. 24, 2008 (JP) ................................. 2008-075719

(51) Int. Cl.
*B05D 1/18* (2006.01)
*B05D 3/04* (2006.01)

(52) U.S. Cl.
USPC ................................. 427/443.2; 427/430.1

(58) Field of Classification Search
USPC ...................................................... 427/430.1
See application file for complete search history.

(56) References Cited

U.S. PATENT DOCUMENTS

| | | | |
|---|---|---|---|
| 4,779,562 A | | 10/1988 | Ono |
| 5,182,140 A | * | 1/1993 | Watanabe et al. ............. 427/230 |
| 5,516,494 A | * | 5/1996 | Domesle et al. ............. 427/243 |
| 5,683,755 A | * | 11/1997 | Godlove et al. ............. 427/430.1 |
| 6,270,850 B1 | * | 8/2001 | Cai et al. .................... 427/430.1 |
| 2008/0118628 A1 | * | 5/2008 | Harris et al. ..................... 427/8 |

FOREIGN PATENT DOCUMENTS

| | | |
|---|---|---|
| CA | 2 537 227 | 3/2005 |
| JP | 54-026832 A1 | 2/1979 |
| JP | 05-067861 A1 | 3/1993 |
| JP | 06-238155 A1 | 8/1994 |
| JP | 2003-275645 A1 | 9/2003 |
| JP | 3652053 B2 | 3/2005 |
| JP | 2007-038210 A1 | 2/2007 |
| WO | 01/38005 A1 | 5/2001 |

OTHER PUBLICATIONS

Canadian Office Action dated Oct. 10, 2012.

* cited by examiner

*Primary Examiner* — David Turocy
(74) *Attorney, Agent, or Firm* — Burr & Brown, PLLC

(57) ABSTRACT

A coating membrane forming method for forming a coating membrane on an object to be coated, the method comprising the steps of: setting the object to be coated for forming a coating membrane thereon in a dipping tank; sending an application liquid for forming the coating membrane into the dipping tank to raise a liquid level of the application liquid till the top of a region for forming the coating membrane thereon in the object to be coated is immersed in the application liquid; and thereafter discharging the application liquid outside the dipping tank to lower the liquid level of the application liquid.

5 Claims, 4 Drawing Sheets

COAT FILM FORMING METHOD AND COAT FILM FORMING APPARATUS

FIELD OF THE INVENTION

The present invention relates to a method and an apparatus for forming a coating membrane having various functions on a surface of an object.

BACKGROUND OF THE INVENTION

As a filter to separate a specific gas or liquid from a mixture of a plurality of kinds of gases or liquids, a porous body having a separation membrane formed on its surface is known. Formation of this separation membrane is made by applying a solution containing a precursor to the separation membrane onto a surface of a porous body for forming the separation membrane thereon, thus forming a coating membrane (membrane formation), and followed by performing drying and heat-treatment on thus obtained coating membrane.

Manufacturing a printed wiring circuit board includes the step of forming a resist film having a uniform thickness on a surface of the board, which is done by applying a resist solution onto the surface of the board.

As a method of applying a liquid for forming a membrane (application liquid) onto a surface of a certain object (object to be coated) in manufacturing an article with a membrane having various functions formed on its surface, a dip method has been widely used so far. This method is done, for example as described in Patent Documents 1 to 3, by procedures in which an object to be coated is immersed in an application liquid filled in a vessel (dipping tank), and then the object to be coated is pulled out from the application liquid after a certain time.

However, when a volume or a weight of the object to be coated is large or heavy, the conventional applying method like this requires a large equipment for raising and lowering of the object to be coated associated with its immersion and pull-out, which also makes it difficult to secure a safety in transfer task. When coating membranes are intended to be formed simultaneously on a plurality of objects to be coated, each object to be coated must be raised and lowered with each of them being supported. Further, when a coating membrane is intended to be formed only on a part of a surface of the object to be coated, an entire part other than that part needs to be covered by a sealing material before the object to be coated is immersed in an application liquid, which is laborious.

Patent Document 1: JP-A-2007-38210
Patent Document 2: JP-B-3652053
Patent Document 3: JP-A-5-67861

SUMMARY OF THE INVENTION

The present invention was made in view of the situation as mentioned above, and has an object to provide a coating membrane forming method and a coating membrane forming apparatus not requiring a large equipment to move an object to be coated and capable of forming a coating membrane on an object to be coated more simply and safely.

According to the present invention, to accomplish the object as mentioned above, a coating membrane forming method and a coating membrane forming apparatus as described below are provided.

According to a first aspect of the present invention, a coating membrane forming method for forming a coating membrane on an object to be coated is provided, the method comprising the steps of: setting the object to be coated for forming a coating membrane thereon in a dipping tank; sending an application liquid for forming the coating membrane into the dipping tank to raise a liquid level of the application liquid till the top of a region for forming the coating membrane thereon in the object to be coated is immersed in the application liquid; and thereafter discharging the application liquid outside the dipping tank to lower the liquid level of the application liquid.

According to a second aspect of the present invention, in the coating membrane forming method according to the first aspect, the raising of the liquid level by sending the application liquid into the dipping tank and the lowering of the liquid level by discharging the application liquid outside the dipping tank are performed by raising and lowering of a solution tank which holds the application liquid and communicates with the dipping tank via a conduit.

According to a third aspect of the present invention, in the coating membrane forming method according to the first aspect, the raising of the liquid level by sending the application liquid into the dipping tank and the lowering of the liquid level by discharging the application liquid outside the dipping tank are performed by a pump provided in a conduit which connects a solution tank holding the application liquid and the dipping tank.

According to a fourth aspect of the present invention, in the coating membrane forming method according to the first aspect, the liquid level of the application liquid is lowered at a constant rate.

According to a fifth aspect of the present invention, a coating membrane forming apparatus (a first coating membrane forming apparatus), for forming a coating membrane by applying an application liquid onto at least a part of a surface of an object to be coated is provided, the apparatus comprising: a dipping tank holding the object to be coated; a solution tank holding the application liquid; a raising and lowering device raising and lowering the solution tank; a conduit connecting the solution tank and the dipping tank; and a valve provided in the conduit.

According to a sixth aspect of the present invention, a coating membrane forming apparatus (a second coating membrane forming apparatus), for forming a coating membrane by applying an application liquid onto at least a part of a surface of an object to be coated is provided, the apparatus comprising: a dipping tank holding the object to be coated; a solution tank holding the application liquid; a conduit connecting the solution tank and the dipping tank; and a pump provided in the conduit.

According to a seventh aspect of the present invention, in the coating membrane forming apparatus according to the fifth aspect, the solution tank can control the inner pressure.

According to an eighth aspect of the present invention, the coating membrane forming apparatus according to any of fifth to seventh aspects further comprises a sealing member to seal between a top as well as a bottom of an outer peripheral face of the object to be coated and an inner peripheral face of the dipping tank.

According to a ninth aspect of the present invention, the coating membrane forming apparatus according to the eighth aspect further comprises a pressurized gas supply device for supplying a pressurized gas in a space formed by the inner peripheral face of the dipping tank, the outer peripheral face of the object to be coated, and the sealing members.

According to a tenth aspect of the present invention, in the coating membrane forming apparatus according to any of fifth to ninth aspects, the object to be coated is a porous body with a monolith form.

According to the coating membrane forming method of the present invention, the operation to form a coating membrane on an object to be coated can be done by raising and lowering the liquid level of an application liquid without moving the object to be coated, and thus a large equipment to move the object to be coated is not necessary. In addition, there is no danger associated with a transfer task of a large object to be coated, and thus formation of a coating membrane can be done simply and safely. Further, if a lowering rate of the liquid level is made constant, a membrane with a uniform thickness may be formed independent of a weight or a shape of an object to be coated. In addition, if a plurality of objects to be coated are set in a dipping tank, coating films can be formed on a plurality of objects to be coated simultaneously, and thus an operation time for it can be shortened.

According to the coating membrane forming apparatus of the present invention, the coating membrane forming method of the present invention can be easily executed, and thus the effects resulting from the coating membrane forming method may be obtained. In addition, in the case that an object to be coated is in the shape of a tube or a monolith having an inner space communicating with outside, if a coating membrane is intended to be formed only on an inner surface surrounding the inner space, adhesion of an application liquid onto an outer peripheral face of the object to be coated can be avoided by providing a sealing member to seal between a top as well as a bottom of an outer peripheral face of the object to be coated and an inner face of a dipping tank without covering the entire outer peripheral face of the object to be coated with a sealing material, and thus the number of steps can be reduced. Further, in the case that the object to be coated is the one like a porous body, if a pressurized gas supply device for supplying a pressurized gas into a space formed by an inner peripheral face of the dipping tank, an outer peripheral face of the object to be coated, and the sealing members is provided, and the application liquid is sent while the pressurized gas is supplied into the space, the pressurized gas flows into pores of the porous body and thereby pressurizes inside pores, and this, in turn, suppresses penetration of the application liquid into the pores. With this, a coating membrane with more uniform thickness can be formed on the inner surface. Further, if the solution tank whose inner pressure can be controlled is used, a sending rate of the application liquid into the dipping tank can be increased by pressurizing inside the solution tank when the application liquid is sent into the tank. With this too, penetration of the application liquid into the pores can be suppressed.

In the case of using a pump to raise and lower the liquid level of the application liquid has a merit of making the equipment smaller, though there is a possibility that the lowering rate of the liquid level fluctuates more or less due to a pulsation of the pump. On the other hand, in the case of using the raising and lowering of the solution tank to raise and lower the liquid level of the application liquid has a merit of keeping the lowering rate of the liquid level constant easily and thereby forming a coating membrane with a uniform thickness easily, because there is no pulsation like using a pump, though the equipment becomes more or less larger as compared with the case of using a pump. In addition, a means without using a pump is advantageous in safety and durability when an application liquid of an organic solvent having a high solubility, volatility, and flammability, or a highly corrosive solution such as an acid and an alkali is used.

DESCRIPTION OF REFERENCE NUMBERS USED IN DRAWINGS

Figure 1:
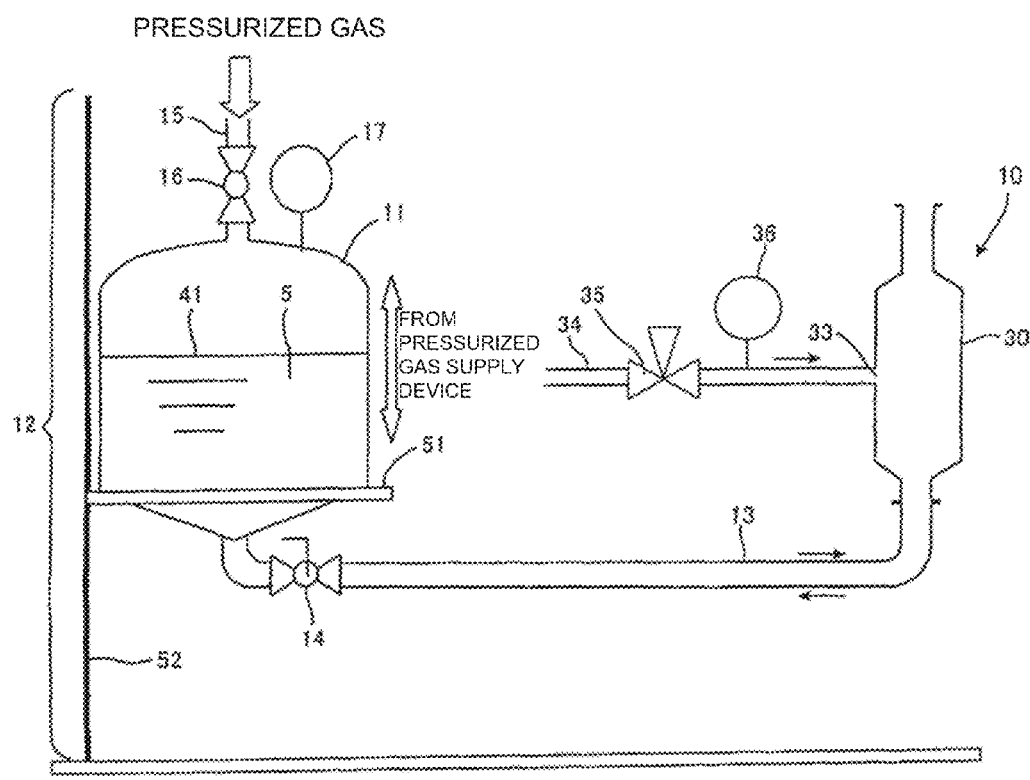
FIG. 1 is a schematic drawing showing one example of an embodiment of a first coating membrane forming apparatus of the present invention.

1; Object to be coated, 2; Cell, 3; Hollow part, Glass seal, 5; Application liquid, 10; First coating membrane forming apparatus, 11; Solution tank, 12; Raising and lowering device, 13; Conduit, 14; Valve, 15; Gas pipe, 16; Valve, 17; Pressure gauge, 20; Second coating membrane forming apparatus, 21; Solution tank, 23; Conduit, 24; Pump, 30; Dipping tank, 31; Sealing member, 32; Space, 33; Gas inlet hole, 34; Gas pipe, 35; Control valve, 36; Pressure gauge, 41; Liquid level, 42; Liquid level, 51; Supporting part, 52; Supporting pole.

DETAILED DESCRIPTION OF THE INVENTION

Hereinafter, the present invention will be described by specific embodiments, but should not be interpreted as being limited to them. Various alterations, modifications, or improvements may be added to them based on knowledge of those skilled in the art as far as it does not depart from the scope of the present invention.

As mentioned above, a coating membrane forming method of the present invention is the one for forming a coating membrane on an object to be coated, the method comprising the steps of: setting the object to be coated for forming a coating membrane thereon in a dipping tank; sending an application liquid for forming the coating membrane into the dipping tank to raise a liquid level of the application liquid till the top of a region for forming a coating membrane thereon in the object to be coated is immersed in the application liquid; and thereafter discharging the application liquid outside the dipping tank to lower the liquid level of the application liquid.

Namely, the coating membrane forming method of the present invention performs a series of steps of forming a coating membrane (membrane-forming processes), in which an object to be coated is immersed in an application liquid and then is left over the liquid level of the application liquid, by raising and lowering the liquid level of the application liquid rather than by a conventional technique as mentioned above involving an up-and-down movement of the object to be coated.

According to this method, formation of a coating membrane may be done without moving an object to be coated, and thus a large equipment for moving the object to be coated is not necessary. In addition, a danger associated with its transfer task may be diminished even if the object to be coated is large. Further, if a lowering rate to lower the liquid level of the application liquid is made constant, a membrane with a uniform thickness may be formed independent of a weight or a shape of the object to be coated. In addition, in the case that coating membranes are formed on a plurality of objects to be coated simultaneously, it is not necessary to raise and lower each object to be coated with each of them being supported as in the case of a conventional technique. Rather, formation of coating membranes may be done by totally the same operation as the case of forming the coating membrane formation on one object to be coated if once a plurality of the objects to be coated are set in the dipping tank, and thus it is not laborious and can shorten an operation time.

In the coating membrane forming method of the present invention, the raising of the liquid level by sending the application liquid into the dipping tank and the lowering of the liquid level by discharging the application liquid outside the dipping tank may be done in any method. One suitable method thereof is to raise and lower the solution tank which holds the application liquid and communicates with the dipping tank via a conduit.

Specifically, at first the solution tank is raised until the liquid level of the application liquid in the solution tank reaches the highest part of the region for forming a coating membrane thereon in the object to be coated, the object to be coated being set inside the dipping tank. With this, the application liquid is sent from inside the solution tank into the dipping tank via a conduit. Liquid levels of the application liquid in the dipping tank and the solution tank connected with each other coincide under an atmospheric pressure so that the liquid level of the application liquid sent into the dipping tank also reaches the highest part. After the state that the region for forming a coating membrane thereon in the object to be coated is immersed in the application liquid as mentioned above is obtained, the solution tank is lowered until the liquid level of the application liquid in the solution tank reaches below the lowest part of the object to be coated. With this, the liquid level of the application liquid in the dipping tank also reaches below the lowest part, and with this lowering of the liquid level a coating membrane is formed on the object to be coated.

In addition to this method, raising and lowering of the liquid level may be performed, for example, by a pump provided in the conduit connecting the solution tank which holds the application liquid and the dipping tank. Namely, at first the pump is rotated (forward rotation) so that the liquid level of the application liquid in the solution tank sent into the dipping tank through the conduit is raised until the liquid level of the application liquid in the dipping tank reaches the highest part of the region for forming a coating membrane thereon in the object to be coated which is set inside the dipping tank. Thereafter, the pump is rotated reversely to discharge the application liquid in the dipping tank so that the liquid level of the application liquid in the dipping tank is lowered until the liquid level of the application liquid in the dipping tank reaches below the lowest part of the object to be coated, which is set in the dipping tank. With this lowering of the liquid level, a coating membrane is formed on the object to be coated.

In the present invention, the rate of raising the liquid level of the application liquid (raising rate) is not particularly limited. For example, in the case that the object to be coated is a porous body, if the application liquid penetrates into the pores, formation of a coating membrane with smooth surface and uniform thickness may become difficult in a certain case. In such a case, it is preferable that the time for the liquid level to reach from the lowest part of the object to be coated to the highest part of the region for forming a coating membrane thereon is set about 10 to 60 seconds, in view of suppressing penetration into the pores by shortening the contact time of the object to be coated with the application liquid. Here, the time may be controlled by the raising rate of the solution tank when raising and lowering of the liquid level is done by raising and lowering of the solution tank as mentioned above. Alternatively, it may be done by providing a valve in the conduit connecting the solution tank and the dipping tank, wherein the raising rate of the liquid level in the dipping tank may be increased by pressurizing inside the solution tank with the valve being closed in advance or by the operation in which the solution tank is raised in advance and then the valve is opened. In the case that raising and lowering of the liquid level is made by using a pump as mentioned above, the time may be controlled by the foregoing operation of pressurizing inside the solution tank with providing another conduit for sending solution or by controlling the pump's output power.

The rate of lowering the liquid level of the application liquid (lowering rate) is not particularly limited either. However, this rate affects the thickness of the coating membrane to be formed on the object to be coated, and thus it is preferably to set the rate in the range from about 0.1 to about 20 cm/minute depending on the desired thickness appropriately. This lowering rate may be controlled, for example, in the case that raising and lowering of the liquid level is done by raising and lowering of the solution tank as mentioned above, by the lowering rate of the solution tank. In the case that raising and lowering of the liquid level is done by using a pump as mentioned above, the lowering rate may be controlled by the pump's output power. Here, to make the thickness of the coating membrane uniform, it is preferable to make the lowering rate constant. In this view point, it is desirable that raising and lowering of the liquid level are done by raising and lowering of the solution tank, as this does not produce a pulsation such as caused by a pump.

Figure 4:
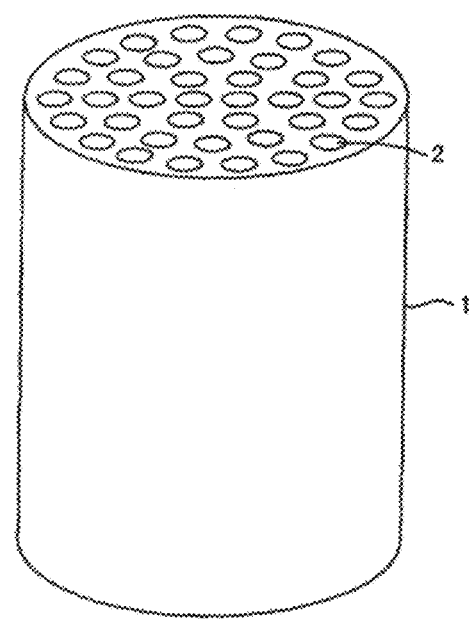
FIG. 4 is a perspective view showing one example of an object to be coated in the present invention.
Figure 5:
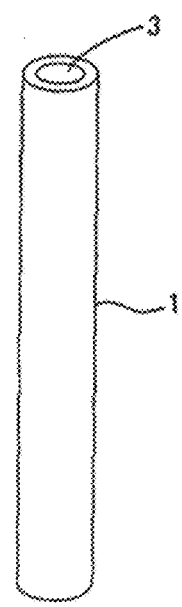
FIG. 5 is a perspective view showing another example of an object to be coated in the present invention.

There are no particular limitations in size and shape of the object to be coated either. In the case that the object to be coated is in the shape like a tube or a monolith which has an inner space communicating with outside and that the coating membrane is formed on an inner surface surrounding the inner space, the object to be coated is set in the dipping tank in a direction so that the application liquid may be raised and lowered in the inner space. For example, as shown in FIG. 4 and FIG. 5, in the case that the object to be coated 1 is in a shape of a monolith having a plurality of cells 2 (through channels) or a shape of a tube having a hollow part 3, it is preferable to set the axis of the cells 2 or the hollow part 3 vertical, because formation of the coating membrane in the inner space thereof can be made uniformly and raising and lowering of the application liquid can be made smoothly.

Component of the application liquid may be selected appropriately depending on a function of the membrane to be formed. For example, in the case that a carbon membrane is formed on the object to be coated as a separation membrane, a solution of a precursor to the carbon membrane (for example, a resin that is carbonated by a heat treatment) may be used as the application liquid.

Figure 2:
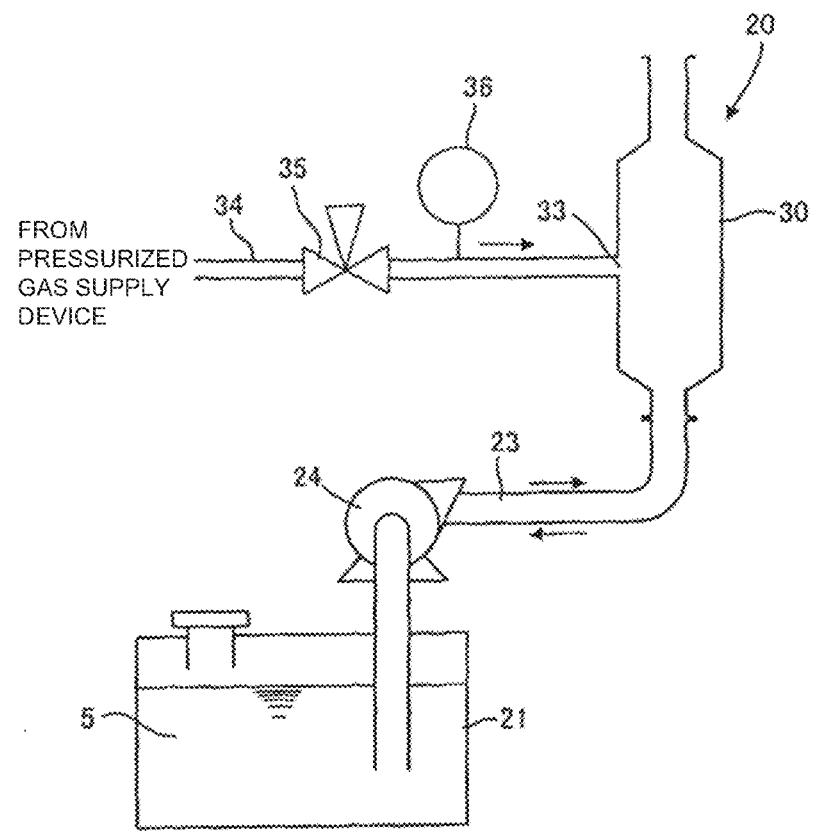
FIG. 2 is a schematic drawing showing one example of an embodiment of a second coating membrane forming apparatus of the present invention.
Figure 3:
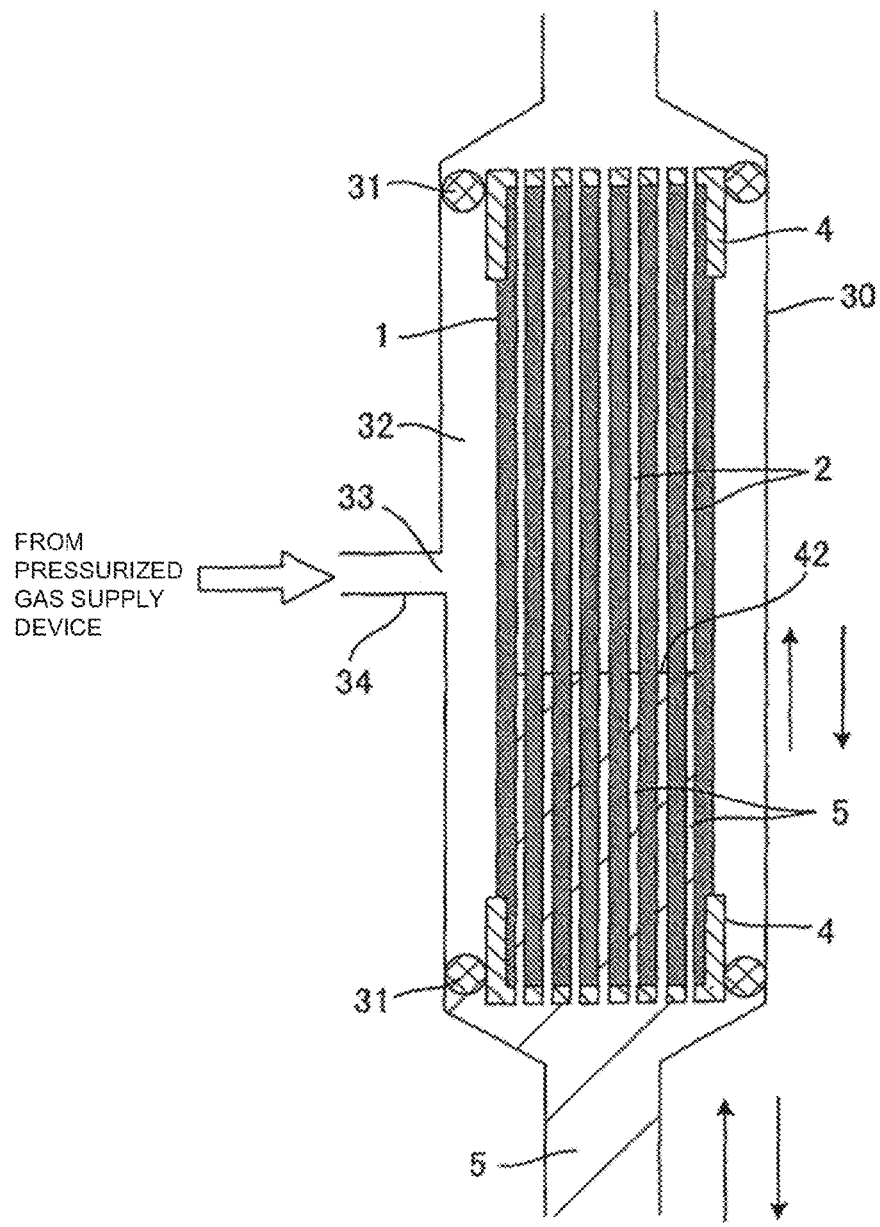
FIG. 3 is a schematic drawing showing inside a dipping tank of the coating membrane forming apparatus shown in FIG. 1 and FIG. 2.

The coating membrane forming method of the present invention may be preferably executed by using the first or second coating membrane forming apparatus of the present invention. FIG. 1 is a schematic drawing showing one example of an embodiment of the first coating membrane forming apparatus of the present invention, FIG. 2 is a schematic drawing showing one example of an embodiment of the second coating membrane forming apparatus of the present invention, and FIG. 3 is a schematic drawing showing inside the dipping tank of the coating membrane forming apparatus shown by FIG. 1 and FIG. 2. Here, the embodiments shown by the drawings are for the case of forming a coating membrane only on an inner peripheral face of the cells 2 using a porous body in the shape of a monolith having a plurality of cells 2 as the object to be coated 1. However, the object to be coated and the region to be coated in the coating membrane forming apparatus of the present invention are not limited to them.

The first coating membrane forming apparatus 10 of the present invention is the one to form a coating membrane by applying an application liquid 5 onto at least a part of the surface of an object to be coated 1, comprising a dipping tank 30 which holds the object to be coated 1, a solution tank 11 which holds the application liquid 5, a raising and lowering device 12 to raise and lower the solution tank 11, a conduit 13 connecting the solution tank 11 and the dipping tank 30, and a valve 14 provided in the conduit 13. Among them, as to the conduit 13, a flexible rubber hose, a flexible tube made of SUS, or the like is preferably used in order to be bent freely according to raising and lowering of the solution tank 11.

In this embodiment, a gas pipe 15 and a valve 16 for supplying a pressurized gas are provided in an upper part of the solution tank 11 as optional composition elements. The pressure inside the solution tank 11 is increased by supplying a pressurized gas through this gas pipe 15 and the increased pressure is decreased by opening the valve 16, thereby forming the composition capable of controlling the inner pressure of the solution tank 11. The pressure inside the solution tank 11 is monitored by a pressure gauge 17.

Further, a packing is provided as a sealing member 31 to seal between the top as well as the bottom of the outer peripheral face of the object to be coated 1 and the inner peripheral face of the dipping tank 30. With this, the application liquid 5 sent into the dipping tank 30 does not flow into a space 32 formed by the inner peripheral face of the dipping tank 30, the outer peripheral face of the object to be coated 1, and the sealing members 31.

In addition, the dipping tank 30 is provided with a gas inlet hole 33 to supply a pressurized gas into the space 32. Through a gas pipe 34 connected to this gas inlet hole 33, a pressurized gas can be supplied into the space 32 from a pressurized gas supply device provided outside. Here, a control valve 35 to control the pressure of the pressurized gas to be supplied and a pressure gauge 36 to monitor the pressure are provided in the gas pipe 34.

In the formation of a coating membrane using the first coating membrane forming apparatus 10, firstly the object to be coated 1 is set in the dipping tank 30. A porous body with a monolith form is the object to be coated 1 in this embodiment, is formed a separation membrane on an inner peripheral face of its cells, and is intended to be used as a filter for liquid separation. As shown in FIG. 3, it has glass seals 4 at its ends and outer peripheral parts near to it to avoid a liquid leakage. If the sealing members (packing) 31 are provided in such a way as mentioned above when the object to be coated 1 is set, the application liquid 5 does not flow into the space 32. Accordingly, attachment of the application liquid 5 onto the outer peripheral face where formation of the coating membrane is not necessary of the object to be coated 1 may be avoided even if the entire outer peripheral face of the object to be coated is not covered by a sealing material. Here, in the case that the coating membrane is formed on entire surface of the object to be coated 1 including the outer peripheral face, a sealing member 31 like this is not necessary. On contrary to this embodiment, in the case that the coating membrane is formed only on the outer peripheral face of the object to be coated 1, the object to be coated is set in the dipping tank 30 in the state that the opening end of the cells 2 is plugged with a masking material and the like so that the application liquid will not flow into the cells 2.

On the other hand, the solution tank 11 is filled with the application liquid 5 with the valve 14 being closed, and then the solution tank 11 is raised until the liquid level 41 reaches above the top end of the object to be coated 1. When the valve 14 is opened under this state, the application liquid 5 in the solution tank 11 is sent into the dipping tank 30. Here, the raise of the solution tank 11 may also be done with the valve 14 being opened. In addition, in order to accelerate the raising of the liquid level 42 of the application liquid 5 sent into the dipping tank 30, an inner pressure of the solution tank 11 may be increased by supplying a pressurized gas through the gas pipe 15 before the valve 14 is opened.

Thus, the application liquid 5 sent into the dipping tank 30 flows into inside the cells 2 from the bottoms of the cells 2 of the object to be coated 1, raises its liquid level 42 gradually, and reaches the same height as the liquid level 41 of the application liquid 5 in the solution tank 11, namely above the top end of the object to be coated 1. Here, in the case that the inner pressure of the solution tank 11 is increased by supplying a pressurized gas into the solution tank 11, both liquid levels 41 and 42 become the same heights when the pressure inside the solution tank 11 is released to an atmospheric pressure.

In the case that the object to be coated 1 is a porous body with a monolith form having a plurality of cells 2, as in the case of this embodiment, when the application liquid 5 is sent into the cells 2 of the object to be coated 1 which is set inside the dipping tank 30 while supplying a pressurized gas into the space 32, inside the pores of the porous body is pressurized as the pressurized gas supplied into the space 32 flows into the pores. As a result, the application liquid 5 does not penetrate into the pores so much, and thus most of it attaches only on the inner peripheral face surrounding the cells 2, thereby leading to formation of a coating membrane with smooth surface and uniform thickness. The pressure of the pressurized gas to be supplied is preferably 1 to 1,000 kPa as the value measured by a pressure gauge 35. With this, the pressure inside the pores of the object to be coated 1 becomes nearly 1 to 1,000 kPa.

After the state in which the entire area for forming the coating membrane thereon in the inner peripheral face of the cells 2 is immersed in the application liquid is obtained in the way as mentioned above, the solution tank 11 is lowered. Here, in the case that the solution tank 11 is pressurized inside by supplying a pressurized gas into the solution tank 11, the solution tank 11 is lowered after the pressure in the solution tank 11 is released by opening the valve 16. As the tank 11 is lowered in this way, the liquid level 41 of the application liquid 5 in the solution tank 11 is also lowered, which is accompanied by the lowering of the liquid level 42 of the application liquid 5 (application liquid in cells of the object to be coated) in the dipping tank 30. Accordingly, when the solution tank 11 is lowered until the liquid level 42 reaches below the bottom end of the object to be coated 1, the state in which the object to be coated 1 is left over the liquid level 42 of the application liquid 5 is obtained.

When the liquid level 42 of the application liquid 5 is lowered in the way as mentioned above, a coating membrane is formed on the entire inner peripheral face of the cells 2. Here, the composition of the raising and lowering device 12 to raise and lower the solution tank 11 is not particularly limited, but it is preferable that the device have the composition with constant rates of raising and lowering in view of obtaining a coating membrane with a uniform thickness. The raising and lowering device 12 in this embodiment comprises a supporting part 51 to support the solution tank 11 and a driving device (not shown in the Figure) to raise and lower the supporting part 51 along the vertically provided supporting pole 52. As the driving device, for example, a rate-variable motor of an inverter type and the like are preferably used.

The second coating membrane forming apparatus 20 of the present invention is the one to form a coating membrane by applying the application liquid 5 onto at least apart of the surface of the object to be coated 1, and comprises a dipping tank 30 which holds the object to be coated 1, a solution tank 21 which holds the application liquid 5, a conduit 23 connecting the solution tank 21 and the dipping tank 30, and a pump 24 provided in the conduit 23.

Detailed description on the composition of the dipping tank 30 in this embodiment is omitted because it is the same composition as that of the dipping tank 30 in the embodiment of the first coating membrane forming apparatus 10, including optional composition elements.

In the formation of a coating membrane using this second coating membrane forming apparatus 20 too, firstly the object to be coated 1 is set in the dipping tank 30 in a similar manner to the embodiment using the first coating membrane forming apparatus 10.

Then, the application liquid 5 filled in the solution tank 21 is sent into the dipping tank 30 through the conduit 23 by rotating (forward rotation) the pump 24. The application liquid 5 sent into the dipping tank 30 in the way as mentioned above flows into the cells 2 from the bottom ends of the cells 2 of the object to be coated 1 while gradually raising its liquid level 42. This sending of the application liquid 5 by the pump 24 is continued until the liquid level 42 reaches above the top end of the object to be coated 1.

In the case that the object to be coated 1 is the porous body with a monolith form having a plurality of cells 2 like this embodiment, when the application liquid 5 is sent into the cells 2 of the object to be coated 1 which is set in the dipping tank 30 while supplying a pressurized gas into the space 32 formed by the inner peripheral face of the dipping tank 30, the outer peripheral face of the object to be coated 1, and the sealing members (packing) 31 in a similar manner to the embodiment of the first coating membrane forming apparatus 10, the pressurized gas supplied into the space 32 flows into pores of the porous body, thereby pressurizing inside pores. As a result, the application liquid does not penetrate into the pores so much, and thus most of it attaches only on the inner peripheral face surrounding the cells, thereby leading to formation of a coating membrane with smooth surface and uniform thickness.

After the entire area for forming the coating membrane in the inner peripheral face of the cells 2 is immersed in the application liquid 5 in the way as mentioned above, the pump 24 is rotated reversely to discharge the application liquid 5 (the application liquid in cells of the object to be coated) in the dipping tank 30, thereby lowering the liquid level 42. When this reverse rotation of the pump 24 to discharge the application liquid 5 is continued until the liquid level 42 reaches below the bottom end of the object to be coated 1, the state in which the object to be coated 1 is above the liquid level 42 left from the application liquid 5 is obtained. When the liquid level of the application liquid 5 is lowered in the way as mentioned above, a coating membrane is formed on the entire inner peripheral face of the cells 2.

EXAMPLES

Hereinafter, the present invention will be described in more detail by Examples, but the present invention is not limited to these Examples.

Example 1

A porous body with a monolith form having a plurality of cells and with a column-shaped appearance (diameter of 180 mm and length of 1,000 mm, with glass-sealed end faces) was used as the object to be coated. The object to be coated 1 was set in the dipping tank 30 of the coating membrane forming apparatus 10 as shown in FIG. 1 with the sealing members (packing) 31 set as shown in FIG. 3 so that a coating membrane comprising a thermosetting polyimide resin precursor would be formed on the inner peripheral face of the cells. A solution of the thermosetting polyimide resin precursor was filled in the solution tank 11 with the valve 14 being closed. Then, the solution tank 11 was raised until its liquid level reached above the top end of the object to be coated 1 while supplying a pressurized gas into the solution tank 11 to pressurize inside of the solution tank 11.

Thereafter, the solution in the solution tank 11 was sent into the dipping tank 30 by opening the valve 14 while supplying a pressurized gas into the space 32 formed by the inner peripheral face of the dipping tank 30, the outer peripheral face of the object to be coated 1, and the sealing members (packing) 31, as shown in FIG. 3. The solution sent into the dipping tank 30 in the way as mentioned above reached the bottom end of the object to be coated 1 by flowing from the lower part (bottom part) of the dipping tank 30, and raised its liquid level gradually by flowing into the cells 2. Finally the liquid level reached slightly above the top end of the object to be coated 1, resulting in the state in which the inner peripheral face of the cells 2 was totally immersed in the solution. The time from when the liquid level reached the bottom end of the object to be coated 1 to when the liquid level reached the top end of the object to be coated 1 was 40 seconds.

Then, the valve 16 in the upper part of the solution tank 11 was opened to release an inner pressure to an atmospheric pressure, and then the solution tank 11 was lowered at the rate of 5 cm/minute until the liquid level of the solution in the solution tank 11 reached below the bottom end of the object to be coated 1. Accompanying with this, the liquid level of the solution (solution in cells of the object to be coated) in the dipping tank 30 also lowered at the same rate as the solution tank 11 lowered, thereby forming a coating membrane on the inner peripheral face of the cells 2. After a coating membrane was formed in the way as mentioned above, the surface of the coating membrane was pre-dried at 120° C. and hardened by heating at 300° C. The obtained membrane had a smooth surface and a nearly uniform thickness.

Example 2

A porous body with a monolith form having a plurality of cells and with a column-shaped appearance (diameter of 180 mm and length of 1,000 mm, with glass-sealed end faces) was used as the object to be coated. The object to be coated 1 was set in the dipping tank 30 of the coating membrane forming apparatus 20 as shown in FIG. 2 with the sealing materials (packing) 31 set as shown in FIG. 3 so that a coating membrane comprising a thermosetting polyimide resin precursor would be formed on the inner peripheral face of the cells.

Thereafter, as shown in FIG. 3, the thermosetting polyimide resin precursor solution filled in the solution tank 21 was sent into the dipping tank 30 by rotating the pump 24 (forward rotation) while supplying a pressurized gas into the space 32 formed by the inner peripheral face of the dipping tank 30, the outer peripheral face of the object to be coated 1, and the sealing members (packing) 31. The solution sent into the dipping tank 30 in the way as mentioned above reached the bottom end of the object to be coated 1 by flowing from the lower part (bottom part) of the dipping tank 30, and raised its liquid level gradually by flowing into the cells 2. When the liquid level reached slightly above the top end of the object to be coated 1, the pump was stopped. The time from when the liquid level reached the bottom end of the object to be coated 1 to when the liquid level reached the top end of the object to be coated 1 was 60 seconds.

Then, the pump 24 was rotated reversely to discharge the solution (solution in cells of the object to be coated) in the dipping tank 30 to lower its liquid level at the rate of 5 cm/minute, and thereby formed a coating membrane on the inner peripheral face of the cells 2. After a coating membrane was formed in the way as mentioned above, the surface of the coating membrane was pre-dried at 120° C. and hardened by heating at 300° C. The obtained membrane had a smooth surface and a nearly uniform thickness.

Example 3

Fifteen porous bodies with tube forms (outer diameter of 10 mm and length of 1,000 mm) were used as the objects to be coated. These 15 tubular objects to be coated were set in the dipping tank 30 of the coating membrane forming apparatus 10 as shown in FIG. 1 with their opened area at the both ends being plugged with a masking material so that a coating membrane comprising a thermosetting polyimide resin precursor would be formed on their outer peripheral faces simultaneously. A solution of the thermosetting polyimide resin precursor was filled in the solution tank 11 with the valve 14 being closed. Then, the solution tank 11 was raised until its liquid level reached above the top end of the object to be coated while supplying a pressurized gas into the solution tank 11 to pressurize inside the solution tank 11.

Then, the valve 14 was opened to send the solution in the solution tank 11 into the dipping tank 30. The solution sent into the dipping tank 30 in the way as mentioned above reached the bottom end of the object to be coated by flowing from the lower part (bottom part) of the dipping tank 30, and raised its liquid level gradually. Finally the liquid level reached slightly above the top end of the object to be coated, resulting in the state in which the outer peripheral face of the object to be coated was totally immersed in the solution. The time from when the liquid level reached the bottom end of the object to be coated to when the liquid level reached the top end of the object to be coated was 40 seconds.

Then, the valve 16 in the upper part of the solution tank 11 was opened to release an inner pressure to an atmospheric pressure, and then the solution tank 11 was lowered at the rate of 5 cm/minute until the liquid level of the solution in the solution tank 11 reached below the bottom end of the object to be coated. Accompanying with this, the liquid level of the solution in the dipping tank 30 was also lowered at the same rate as the solution tank 11 lowered, thereby forming a coating membrane on the outer peripheral face of the object to be coated. After a coating membrane was formed in the way as mentioned above, the surface of the coating membrane was pre-dried at 120° C. and hardened by heating at 300° C. The obtained membrane had a smooth surface and a nearly uniform thickness.

INDUSTRIAL APPLICABILITY

The present invention can be favorably applied as a method and an apparatus for forming a coating membrane having various functions on a surface of an object.

The invention claimed is:

1. A coating membrane forming method for forming a coating membrane on an object to be coated, the method comprising the steps of:
   setting the object to be coated for forming a coating membrane thereon in a dipping tank;
   sending an application liquid for forming the coating membrane into the dipping tank to raise a liquid level of application liquid in the dipping tank until a top of a region for forming the coating membrane on the object to be coated is immersed in the application liquid; and
   thereafter lowering the liquid level of the application liquid in the dipping tank by discharging the application liquid outside the dipping tank;
   wherein during immersion a pressurized gas is supplied in a space defined by an inner peripheral face of the dipping tank, an outer peripheral face of the object to be coated, and a respective sealing member, which respectively define a seal between a top and a bottom of the outer peripheral face of the object to be coated and the inner peripheral face of the dipping tank, so that the pressurized gas flows into pores of the object to be coated to pressurize insides of the pores, and
   wherein the object to be coated is a porous body.

2. The coating membrane forming method according to claim 1, wherein the raising of the liquid level in the dipping tank and the lowering of the liquid level in the dipping tank are performed by raising and lowering a solution tank holding the application liquid and which is in communication with the dipping tank via a conduit.

3. The coating membrane forming method according to claim 1, wherein the raising of the liquid level in the dipping tank and the lowering of the liquid level in the dipping tank are performed by a pump provided in a conduit connecting a solution tank holding the application liquid and the dipping tank.

4. The coating membrane forming method according to claim 1, wherein the liquid level of the application liquid is lowered at a constant rate.

5. The coating membrane forming method according to claim 1, wherein the porous body has a monolith form.

\* \* \* \* \*